(12) United States Patent
Boak

(10) Patent No.: US 8,279,344 B2
(45) Date of Patent: Oct. 2, 2012

(54) SYNCHRONIZATION OF VIDEO PRESENTATION BY VIDEO CADENCE MODIFICATION

(75) Inventor: Adrian Boak, Woodlawn (CA)

(73) Assignee: QNX Software Systems Limited, Kanata, Ontario (CA)

(*) Notice: Subject to any disclaimer, the term of this patent is extended or adjusted under 35 U.S.C. 154(b) by 422 days.

(21) Appl. No.: 12/637,426

(22) Filed: Dec. 14, 2009

(65) Prior Publication Data

US 2011/0141355 A1    Jun. 16, 2011

(51) Int. Cl.
*H04N 9/475* (2006.01)
(52) U.S. Cl. .................. 348/513; 348/512; 348/515
(58) Field of Classification Search .............. 348/513, 348/510, 512, 515, 500; 375/354, 355, 362; 386/201, 203, 207; H04N 5/04, 9/475
See application file for complete search history.

(56) References Cited

U.S. PATENT DOCUMENTS

| 6,337,883 B1 | 1/2002 | Tanaka |
| 6,950,144 B2 * | 9/2005 | Chae ............................ 348/513 |

FOREIGN PATENT DOCUMENTS

| EP | 1 549 066 A2 | 6/2005 |
| EP | 1 558 033 A1 | 7/2005 |
| WO | WO 99/52281 A2 | 10/1999 |

* cited by examiner

*Primary Examiner* — Sherrie Hsia
(74) *Attorney, Agent, or Firm* — Brinks Hofer Gilson & Lione

(57) ABSTRACT

A system synchronizes a video presentation to a master time reference (e.g., a corresponding audio presentation) by modifying a video cadence. The system detects when a displayed video leads or lags a master time reference by a programmable level or more. The system minimizes the synchronization error by inserting or removing source video frames to or from a frame cadence pattern.

24 Claims, 7 Drawing Sheets

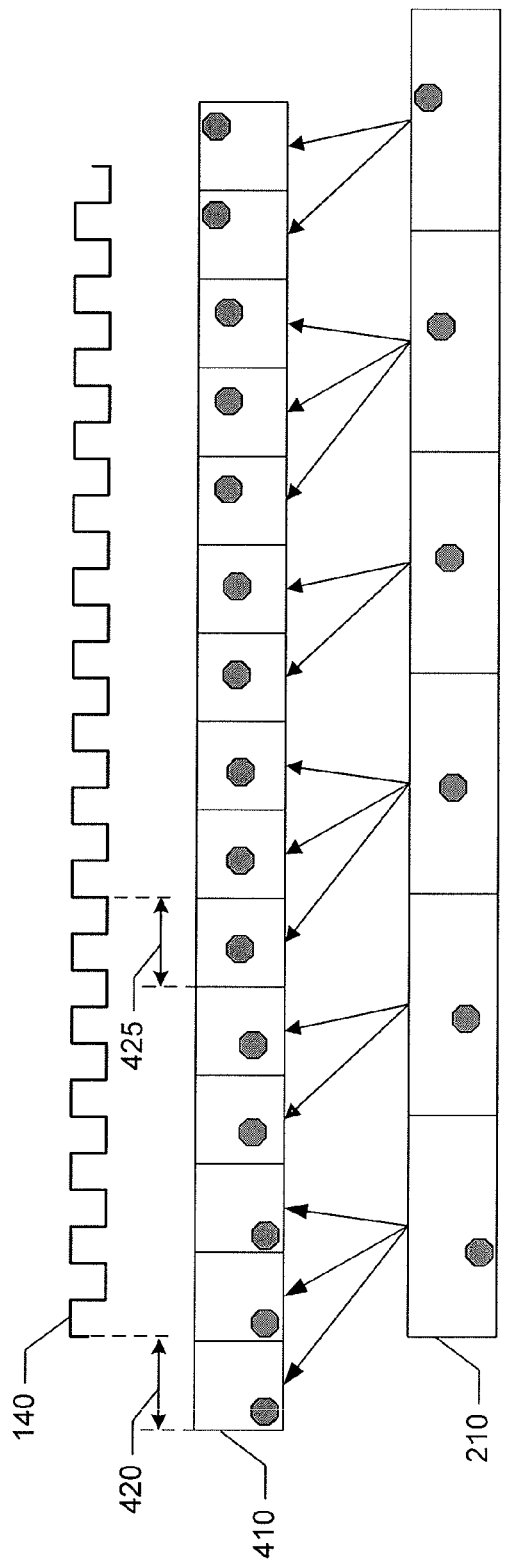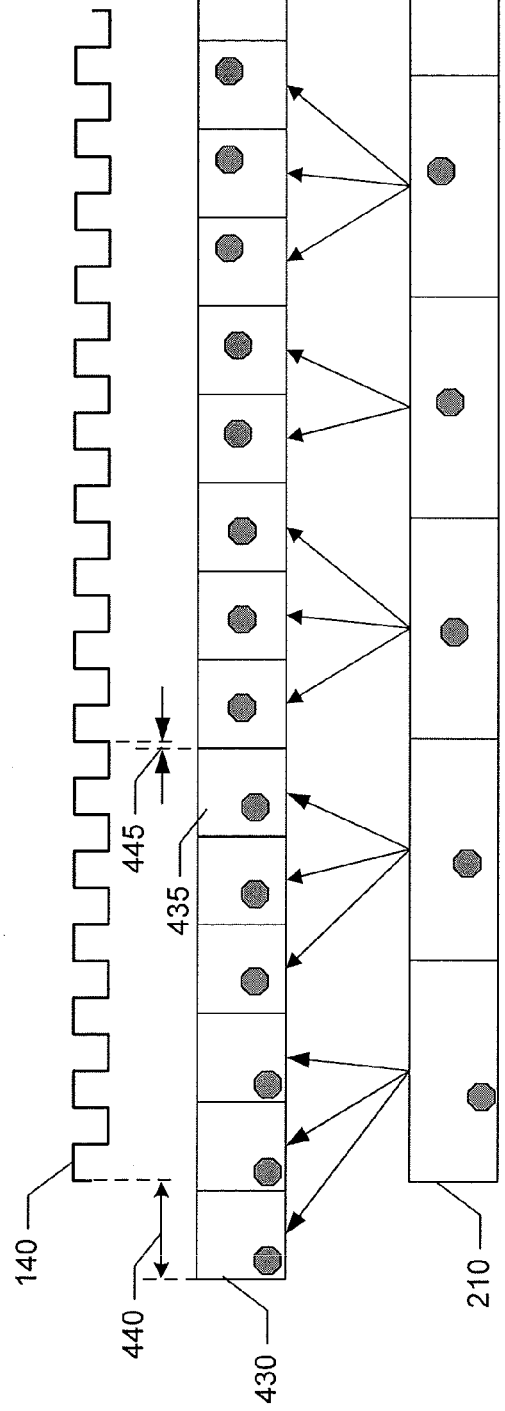

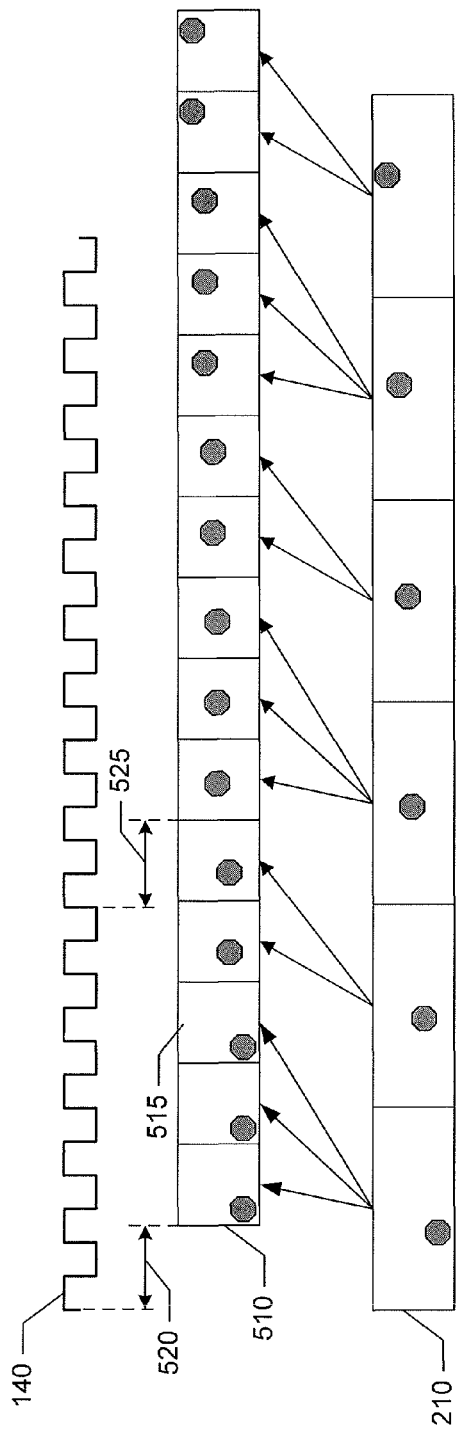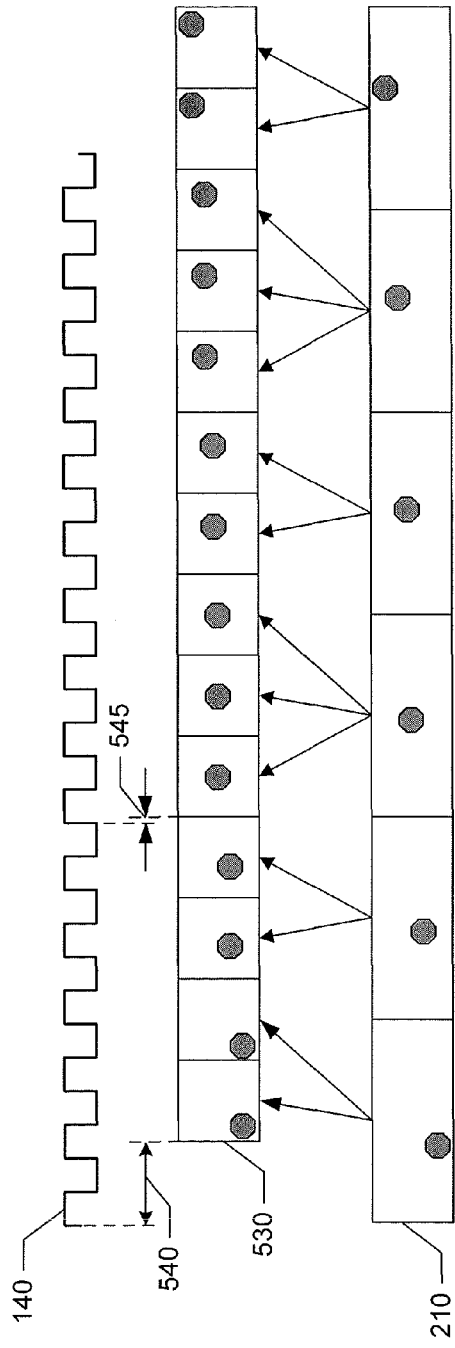

US 8,279,344 B2

SYNCHRONIZATION OF VIDEO PRESENTATION BY VIDEO CADENCE MODIFICATION

BACKGROUND OF THE INVENTION

1. Technical Field

This disclosure relates to synchronizing video presentations, and more particularly, to systems that synchronize video presentations to a master time reference through a modified video cadence.

2. Related Art

When presenting video content having a frame rate that differs from the frame rate of a targeted output device, a "cadence" may maintain a smooth visual display. To display a 24 frame-per-second (fps) movie on a National Television System(s) Committee (NTSC) format at 30 fps, a 3:2 cadence can be used. In a 3:2 cadence pattern, an input frame is displayed for 3 output frame durations before the next input frame is displayed for 2 output frame durations. The cadence pattern is then continuously repeated. Other cadence patterns can be used, for example, for 25 fps and 30 fps source video, and 50 fps Phase Alternating Line (PAL) display frame rates.

It may be desirable to synchronize a video presentation to an audio presentation. In one approach, the timing of the audio presentation may serve as a master time reference and the timing of presentation of the video frames is regulated to coincide with the master time. In this approach a correct cadence pattern may not be maintained as the audio clock may not be in synchronization (a.k.a. in sync) with the frame boundaries of the video display (a.k.a. vertical sync). The audio clock and the vertical sync may be subject to drift over time that results in a visual judder. In a second approach, the vertical sync interval of the video display is used as the master time reference and the audio clock is adjusted to coincide with the vertical sync intervals. In this approach, the individual frames of the audio stream may need to be stretched or compressed, requiring relatively complex computing-intensive processes to maintain synchronization. Such processes may render audio artifacts that may be perceived by a listener.

SUMMARY

A system synchronizes a video presentation to a master time reference (e.g., a corresponding audio presentation) by modifying a video cadence. The system detects when a displayed video leads or lags a master time reference by a programmable level or more. The system minimizes the synchronization error by inserting or removing source video frames to or from a frame cadence pattern.

Other systems, methods, features and advantages will be, or will become, apparent to one with skill in the art upon examination of the following figures and detailed description. It is intended that all such additional systems, methods, features and advantages be included with this description, be within the scope of the invention, and be protected by the following claims.

BRIEF DESCRIPTION OF DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4A and FIG. 4B are schematic representations of a video input stream that is being cadenced for presentation on a video display device and that is leading the master time reference, showing respectively scenarios for before and after correction.

FIG. 5A and FIG. 5B are schematic representations of a video input stream that is being cadenced for presentation on a video display device and that is lagging the master time reference, showing respectively scenarios for before and after correction.

DETAILED DESCRIPTION

Figure 1:
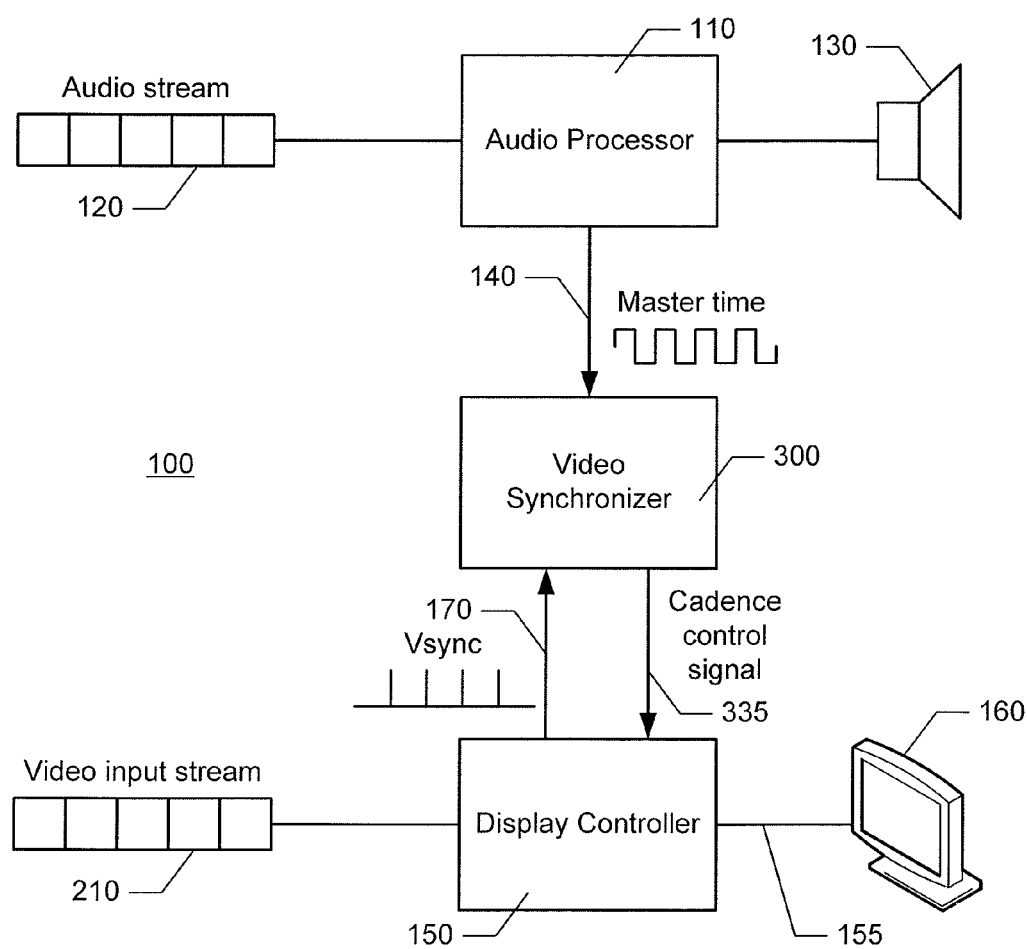
FIG. 1 is a schematic representation of an exemplary video synchronizer for synchronization of a video presentation to an audio presentation by video cadence modification.

FIG. 1 is a schematic representation of a video synchronizer 300 for synchronization of a video presentation to an audio presentation by video cadence modification illustrated in a typical operating environment 100. The operating environment 100 includes an audio processor 110 that receives a digital audio stream 120 and decodes the contents for playback by way of an audio loudspeaker 130 or other audio playback mechanism. The audio stream 120 has an associated time reference (a.k.a. an audio clock) that can be derived from the encoding rate of the audio stream 120, timestamps contained in the audio stream 120 or a combination of these two mechanisms. The audio processor 110 outputs a master time signal 140 that is referenced to the timing of the audio stream 120. The master time signal 140 can, for example, represent the time elapsed since the beginning of playback of the audio stream 120.

A display controller 150 receives a video input stream 210 and a cadence control signal 335, and generates a video output signal 155 to display the contents of the video input stream 210 on a video display device 160 such as, for example, a computer monitor or multimedia presentation device display. The display controller 150 provides a stream of inter-frame markers (e.g., a vertical synchronization signal (Vsync)) 170 to the video synchronizer 300. The stream of inter-frame markers 170 correspond to boundaries between adjacent frames in the video output signal 155. The video input stream 210 is encoded at a pre-determined frame rate as a function of the encoding scheme that is used (e.g. 24p encoding at 24 frame per second (fps), and 25p encoding at 25 fps). The video display device 160 typically supports one or more vertical synchronization (Vsysnc) rates (e.g. National Television Systems Committee (NTSC) at approximately 60 fps (a.k.a. 60i), and Phase Alternating Line (PAL) at 50 fps (a.k.a. 50i)), also referred to as a refresh rates and alternatively specified in cycles per second (Hz). When the encoding frame rate of the video input stream 210 does not match the Vsync rate being used by the video display device 160, the display controller 150 can convert from the input frame rate to the output (e.g., display) frame rate using a cadencing mechanism. The display controller 150 receives the cadence control signal 335 from the video synchronizer 300. The display controller 150 and the video synchronizer 300 can be included in, for example, a computing platform or a multimedia presentation device. Alternatively, the display controller 150 can include the video synchronizer 300.

Figure 2:
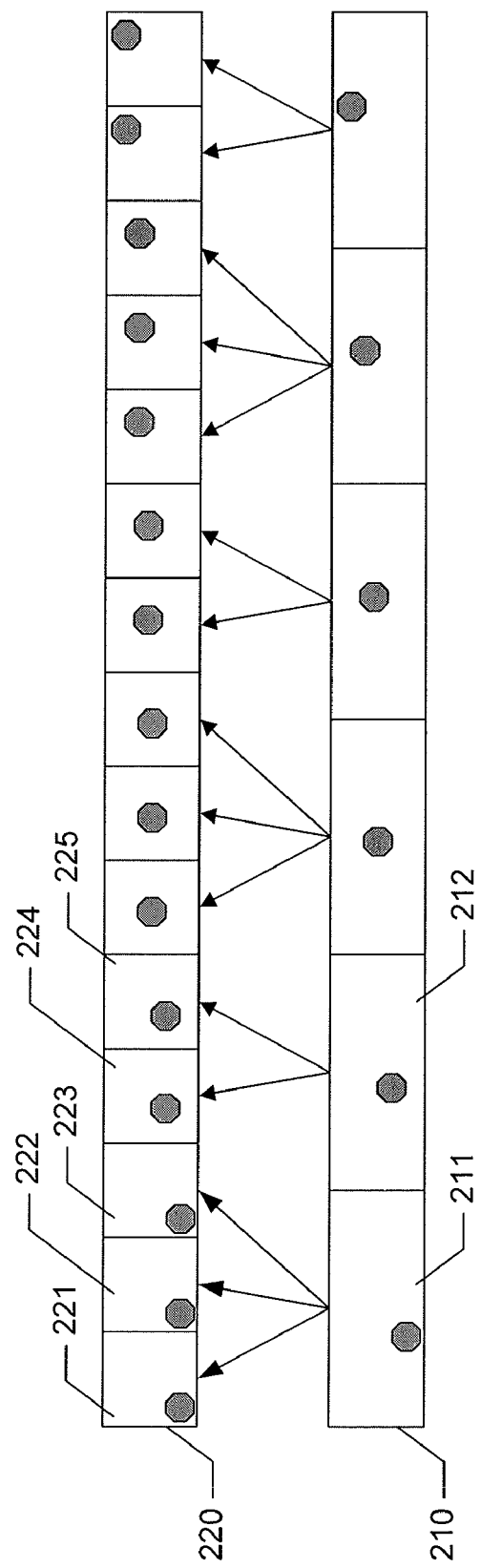
FIG. 2 is a schematic representation of a video input stream being cadenced for presentation on a video display device.

FIG. 2 is a schematic representation of a video input stream 210 being cadenced for presentation on a video display device 160. In FIG. 2, the horizontal axis represents time increasing from left to right. For illustrative purposes cadencing will be described for a video input stream 210 having a 24 fps frame rate and a video display device 160 having a frame rate of 60 fps (e.g., a refresh rate of 60 Hz) that is represented as a series of display frames 220. In the illustrated example a 3:2 cadence pattern is used. The cadence is provided by the display controller 150 responsive to a cadence control signal 335 provided by the video synchronizer 300. The first frame 211 of the video input stream 210 is presented for three display frames 221, 222 and 223 on the video display device 160 (e.g., three Vsync cycles). Then the second frame 212 of the video input stream 210 is presented for two display frames 224 and 225 on the video display device 160. This cadence (e.g., pattern) is repeated for subsequent frames in the video input stream 210 with one frame being presented for three display frames on the video display device 160 and the following frame in the video input stream 210 being presented for two display frames on the video display device 160. While the 3:2 cadence does not necessarily result in an entirely accurate conversion of the 24 fps video input stream 210 to a 60 fps presentation on the video display device 160, the magnitude of any error is small and the appearance of judder to a viewer of the video display 160 is minimal.

Similarly the use of a cadence can be applied to the conversion of a variety of video input 210 frame rates (e.g. 24, 25 and 30 fps) to a variety of video display device 160 frame rates (e.g. 50, 60, 75 and 90 fps). For each combination of input and display frame rates, a different cadence (e.g. 2:3:3:2, 2:2:2:4) can be used. Each cadence pattern (e.g. 3:2) has at least one long frame count (e.g. 3) and at least one short frame count (e.g. 2) representing a maximum and a minimum number of output (e.g., display) frames to be repeated for one input frame respectively. A cadence pattern can include only repetitions of a single frame count such as, for example, when a 30 fps input frame rate is converted to a 60 fps display rate using a 2:2 cadence pattern. For the purposes of this document, when a cadence pattern (e.g. 2:2) is comprised of repetitions of a single frame count, each instance of the single frame count (e.g., 2) represents both the long frame count and the short frame count. A person skilled in the art would be informed that use of a cadence mechanism can be applied to display devices 160 having either interlaced or progressive (e.g., non-interlaced) scanning but for simplicity of presentation in this document no further differentiation of these will be made. The system for synchronization of a video presentation described herein can be applied to either interlaced or progressively scanned display devices 160.

Figure 3:
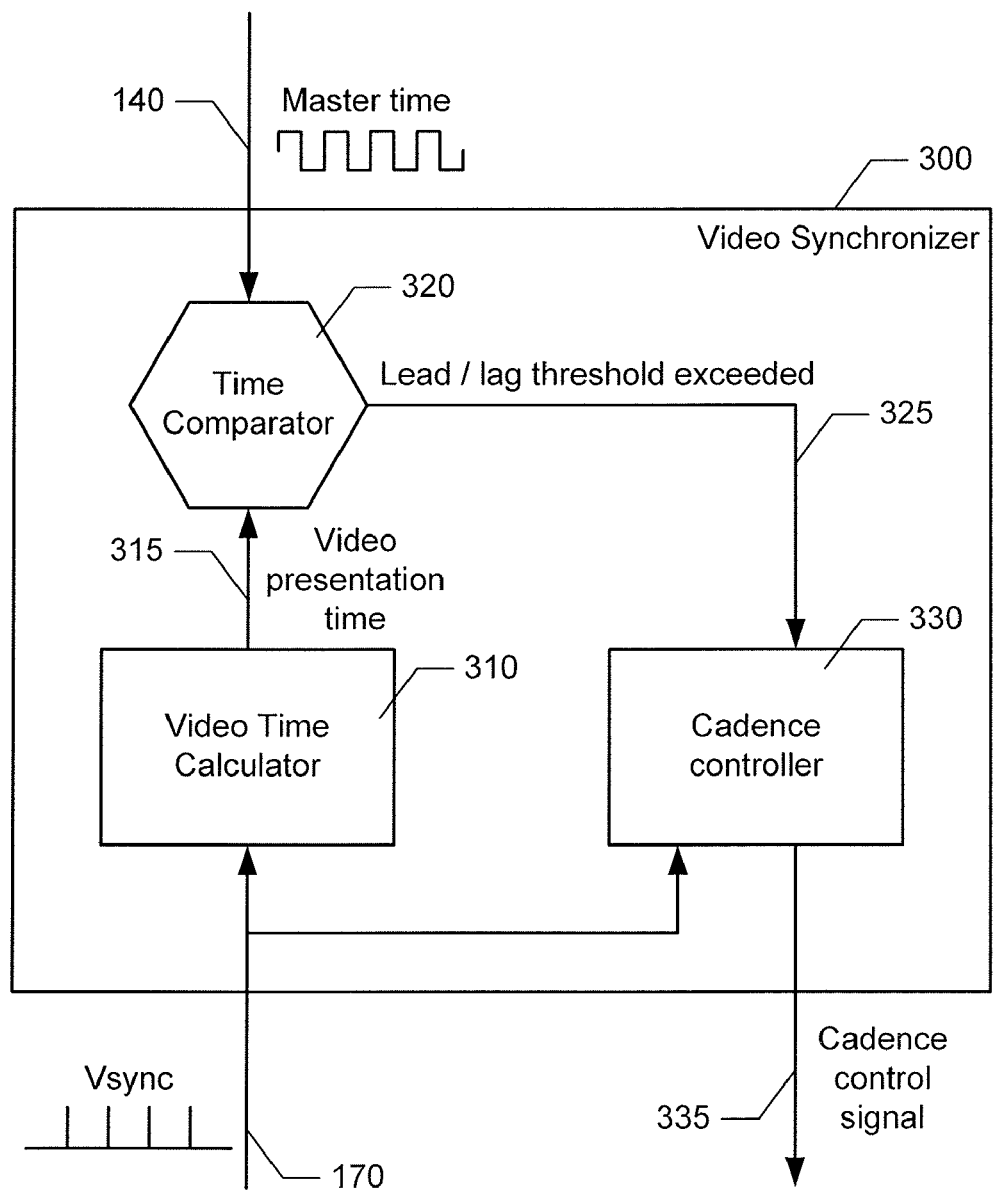
FIG. 3 is a schematic representation of the video synchronizer of FIG. 1.

FIG. 3 is a schematic representation of the video synchronizer 300 of FIG. 1. The video synchronizer 300 comprises a video time calculator 310, a time comparator 320 and a cadence controller 330. The vide time calculator 310 receives the Vsync signal 170 from, for example, the display controller 150 and can derive a video presentation time 315 from the Vsync signal 170 and the video display frame rate. For example, for a display frame rate of 60 fps, each display frame has a duration of 16.667 milliseconds (ms) (i.e. 1/(60*1000)). The video presentation time 315 can be derived by multiplying a Vsync received count by the display frame duration. For example, after receiving two Vsync signal 170 pulses, the video presentation time 315 would be 33.334 ms (i.e. 2*16.667 ms). The video presentation time 315 is provided to the time comparator 320.

The time comparator 320 receives the video presentation time 315 and the master time signal 140 and compares them. The time comparator 320 detects when the video presentation time 315 either leads (e.g., is ahead in time) or lags (e.g., is behind in time) the master time 140 by more than a programmable level amount of time. The programmable level amount is a configurable parameter. The programmable level amount can, for example, be set equal to one display frame duration (e.g., 16.667 ms in the illustrated scenario of FIG. 2). When the time comparator 320 detects that the video presentation time 315 either leads or lags the master time 140 by more than the programmable level amount (e.g. one display frame duration), a lead/lag programmable level exceeded signal 325 is given to the cadence controller 330 respectively indicating a lead or a lag.

The master time reference 140 can, for example, be derived or referenced from the audio stream 120 and be provided by the audio processor 110. Alternatively, the master time reference 140 can be derived or referenced from another source to which the presentation of the video input stream 210 is to be synchronized such as, for example, a real-time clock or a Vsync signal 170 for a second display device (not illustrated).

The cadence controller 330 receives the Vsync signal 170 from, for example, the display controller 150 and generates a cadence signal 335 that is provided to the display controller 150. The cadence controller 330 applies a cadence pattern that is a function of the combination of the video input stream 210 and video display device 160 frame rates. In the example illustrated in FIG. 2, the cadence control signal 335 normally instructs the display controller 150 to display of first video input stream 210 frame for three consecutive display frame durations, then display a second video input stream 210 frame for two consecutive display frames durations, and repeats the 3:2 cadence pattern for each subsequent frame in the video input stream 210. When the cadence controller 330 receives a lead/lag programmable level exceeded signal 325, it modifies the cadence pattern in order to minimize the synchronization error between the video presentation time 315 and the master time 140. When the lead/lag programmable level exceeded signal 325 indicates that the video presentation time 315 is lagging the master time 140, the cadence controller 330 decreases the next occurrence of a long frame count (e.g. 3 in a 3:2 cadence) in the cadence pattern by one display frame (e.g., one display frame is removed). When the lead/lag programmable level exceeded signal 325 indicates that the video presentation time 315 is leading the master time 140, the cadence controller 330 increases the next occurrence of a short frame count (e.g. 2 in a 3:2 cadence) in the cadence pattern by one display frame (e.g., one additional display frame is inserted).

FIGS. 4A and 4B are schematic representations of a video input stream 210, that is being cadenced for presentation on a video display device 160 and that is leading the master time reference 140, showing respectively scenarios for before (FIG. 4A) and after (FIG. 4B) correction. In FIGS. 4A and 4B, the horizontal axis represents time increasing from left to right. The illustrated scenario is based on the example described above with reference to FIG. 2 using a 3:2 cadence. In FIG. 4A the series of video frames 410 being presented on the video display device 160 are leading the master time reference 140. The amount (e.g., time duration) of the lead 420 is greater than one video display frame duration (e.g. 16.667 ms). If no correction is made, the amount of lead 425 will be substantially the same after one repetition of the cadence pattern. In FIG. 4B, the series of video frames 430 being presented on the video display device 160 starts-out leading the master time reference 140 by greater than one video display frame duration (e.g. 16.667 ms). In this scenario, the time comparator 320 of the video synchronizer 300 detects that the lead 440 is greater than the programmable level amount (e.g. one video display frame duration) and sends a lead/lag programmable level exceeded signal 325, indicating that there is a lead, to the cadence controller 330. In response to the lead/lag programmable level exceeded signal 325 and the lead indication, the cadence controller 330, increases the next occurrence of a short frame count (e.g. 2 in the 3:2 cadence) in the cadence pattern by one display frame 435 (e.g., one additional display frame is inserted). After one instance of the modified cadence pattern, the lead 445 of the series of video frames 430 being presented on the video display device 160 is significantly reduced.

FIGS. 5A and 5B are schematic representations of a video input stream 210, that is being cadenced for presentation on, a video display device 160 and that is lagging the master time reference 140 showing respectively scenarios for before (FIG. 5A) and after (FIG. 5B) correction. In FIGS. 5A and 5B, the horizontal axis represents time increasing from left to right. The illustrated scenario is based on the example described above with reference to FIG. 2 using a 3:2 cadence. In FIG. 5A the series of video frames 510 being presented on the video display device 160 are lagging the master time reference 140. The amount (e.g., time duration) of the lag 520 is greater than one video display frame duration (e.g. 16.667 ms). If no correction is made, the amount of lag 525 will be substantially the same after one repetition of the cadence pattern. In FIG. 5B, the series of video frames 530 being presented on the video display device 160 start-out lagging the master time reference 140 by greater than one video display frame duration (e.g. 16.667 ms). In this scenario, the time comparator 320 of the video synchronizer 300 detects that the lag 540 is greater than the programmable level amount (e.g. one video display frame duration) and sends a lead/lag programmable level exceeded signal 325, indicating that there is a lag, to the cadence controller 330. In response to the lead/lag programmable level exceeded signal 325 and the lag indication, the cadence controller 330, decreases the next occurrence of a long frame count (e.g. 3 in the 3:2 cadence) in the cadence pattern by one display frame (e.g., one display frame, corresponding to display frame 515 in series 510, is removed). After one instance of the modified cadence pattern, the lag 545 of the series of video frames 530 being presented on the video display device 160 is significantly reduced.

Figure 6:
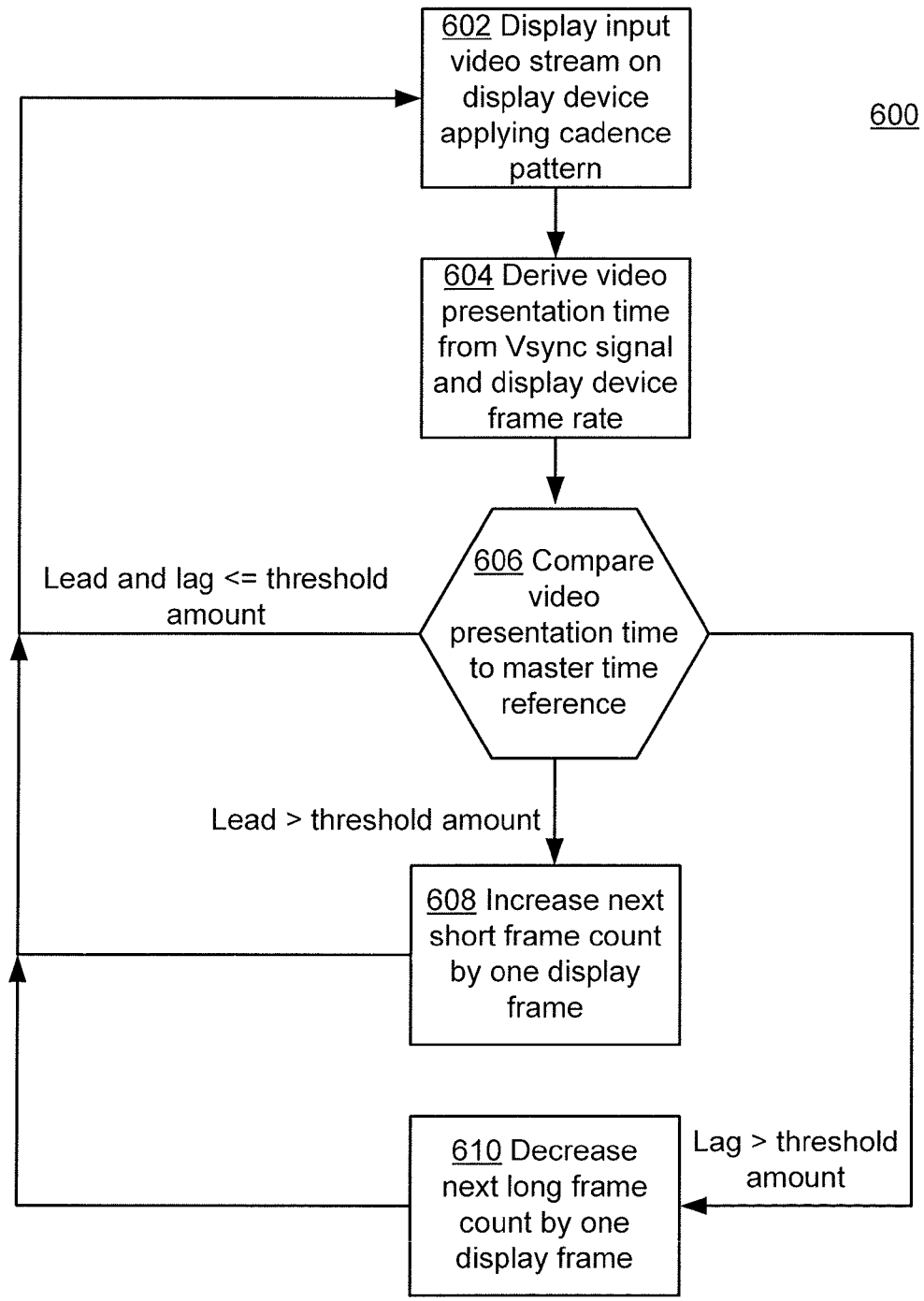
FIG. 6 is flow diagram representing exemplary steps in a method for synchronization of a video presentation to a master time reference by video cadence modification.

FIG. 6 is flow diagram representing the steps in a method 600 for synchronization of a video presentation to a master time reference 140 by video cadence modification. The method 600 can, for example, be implemented using the video synchronizer 300 described above with reference to FIGS. 1 and 3. In step 602, a video input stream 210 is displayed on a video display device 160 by applying a cadence pattern that is a function of the input video steam 210 frame rate and of the display device 160 frame rate. In step 604, a video presentation time 315 is derived from a vertical synchronization signal (a.k.a. Vsysnc) for the display device 160 and from the display device 160 frame rate. In step 606, the video presentation time 315 derived in step 604 is compared to a master time reference 140 to determine if the video presentation time 315 either leads or lags the master time reference 140 by more than a programmable level amount. The master time reference 140 can, for example, be derived from an audio presentation time for an audio stream associated with the video presentation. The programmable level amount can be configurable. The programmable level amount can, for example, be equal to the duration of one display device 160 video frame (e.g., the Vsync interval). When the lead or lag does not exceed the programmable level amount, display of the video input stream 210 continues in accordance with step 602. In step 608, when the video presentation time 315 leads the master time reference 140 by more than the programmable level amount, the next occurrence of a short frame count in the cadence pattern is increased by one display frame and then display of the video input stream 210 continues in accordance with step 602. In step 610, when the video presentation time 315 lags the master time reference 140 by more than the programmable level amount, the next occurrence of a long frame count in the cadence pattern is decreased by one display frame and then display of the video input stream 210 continues in accordance with step 602.

The method 600 can be implemented by processor executable program instructions stored on a processor readable storage medium.

Figure 7:
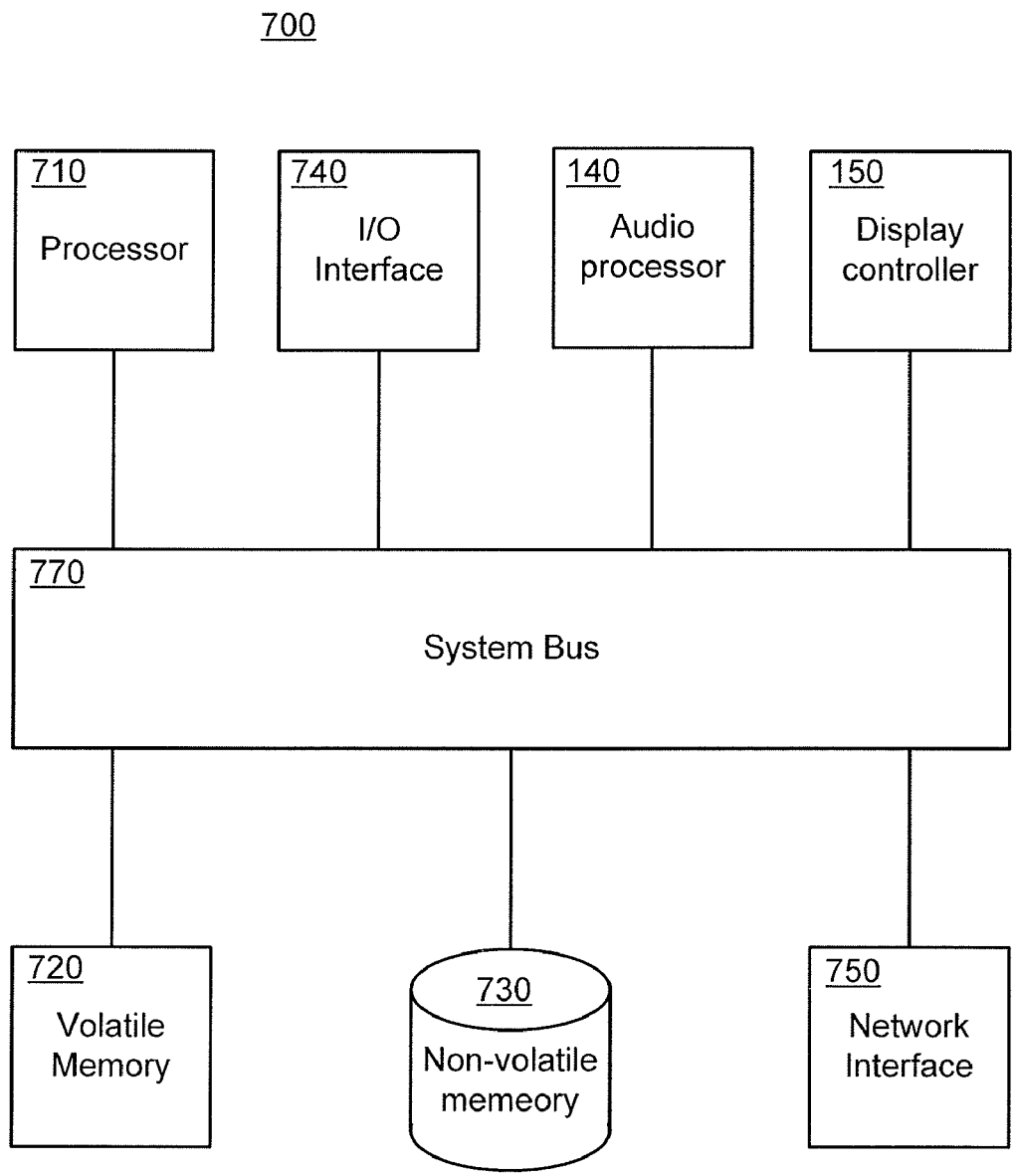
FIG. 7 is a schematic representation of an exemplary computing platform on which the system for synchronization of a video presentation to a master time reference by video cadence modification can be implemented.

FIG. 7 is a schematic representation of an exemplary computing platform 700 on which the method 600 for synchronization of a video presentation to a master time reference by video cadence modification can be implemented. The computing platform 700 comprises well-known components such as, for example, a processor 710, volatile memory 720, non-volatile memory 730, an input/output (I/O) interface 740, a network interface 750, an audio processor 110, a display controller 150, and a system bus 770. The volatile memory 720 can, for example, include random access memory (RAM). The non-volatile memory 730 can include, for example, a hard disk drive (HDD) or a Flash memory device. The volatile memory 720 and the non-volatile memory 730 can store and retrieve processor 710 readable program instructions and data structures. An audio stream 120 can be received via the I/O interface, via the network interface 750 or can be stored in either of the volatile memory 720 and the non-volatile memory 730. A video input stream 210 can be received via the I/O interface, via the network interface 750 or can be stored in either of the volatile memory 720 and the non-volatile memory 730. The display controller 150 can be connected to a video display device 160 (not illustrated). The system bus 770 provides for communications and interoperation between the other components 710, 720, 730, 740, 750, 110, 150 of the computing platform 700. The computing platform 700 can be included in, for example, a computing device (e.g. personal computer or workstation) or a multimedia presentation device. When implemented on a computing platform 700 such as, for example, that described above with reference to FIG. 7, the system 300 and the method 600 for synchronization of a video presentation to a master time reference by video cadence modification, transform the video input stream 210, representing a video presentation content and having a first frame rate, into a video output signal 155, representing the same video presentation content, suitable for presentation on a video display device 160 having a second frame rate while remaining substantially synchronized to the master time reference.

In accordance with the system 300 and the method 600 for synchronization of a video presentation to a master time reference by video cadence modification described herein, an audio clock can be used as the master time reference 140 without the need to modify the audio clock and therefore no audible artifacts are introduced into the audio output. Changes to the video cadence are minimized by only adding or removing, when required, one display frame per repetition of the cadence pattern thereby mitigating the appearance of judder to a viewer of the video display 160.

While the adding of an additional, or the removing of a scheduled, video frame may not result in the precise resynchronization of the video presentation to the master time reference, the continuous application of this technique may converge the synchronization error (e.g., lead or lag) to within plus or minus one programmable level amount which may be imperceptible to the viewer. This approach mitigates the processing requirement compared to traditional approaches that attempt to precisely resynchronize the video presentation and therefore typically include highly processing intensive stretching and compressing of either the video presentation or the master time reference. The traditional methods also typically result in the introduction of artifacts into the video presentation that may be objectionable to the viewer.

While various embodiments of the invention have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A video synchronizer comprising:
   a video time calculator that monitors the frequency of a frame rate and a stream of inter-frame markers;
   a comparator that compares an output of the video time calculator to a master time reference associated with a data stream; and
   a cadence controller programmed to compensate for a difference between the master time reference and the output of the video time calculator by adjusting a long frame count or a short frame count that together comprises a cadence pattern that renders a transmission to a display;
   where the cadence controller is programmed to compensate for the difference by decreasing the long frame count of the cadence pattern when the output of the video time calculator lags the master time reference.

2. The video synchronizer of claim 1 where the frame rate comprises a video display frame rate.

3. The video synchronizer of claim 2 where the stream of inter-frame markers correspond to boundaries between adjacent frames in the transmission to the display.

4. The video synchronizer of claim 2 where the output of the video time calculator comprises a video presentation time, where the master time reference is associated with an audio stream, and where the cadence controller is programmed to increase the short frame count or decrease the long frame count in response to a determination that the video presentation time leads or lags the master time reference associated with the audio stream by more than a programmable threshold.

5. The video synchronizer of claim 1 where the comparator and the cadence controller comprises a processor that executes instructions stored on a non-transitory computer readable medium comprising:
   computer program code that determines when the output of the video time calculator is not in synchronization with the master time reference;
   computer program code that determines when the output of the video time calculator is leading or lagging the master time reference; and
   computer program code that compensates for a leading or a lagging difference by adjusting the long frame count or the short frame count that together comprises the cadence pattern that renders the transmission to the display.

6. The video synchronizer of claim 5 where the processor communicates with a receiver in communication with an audio processor.

7. The video synchronizer of claim 5 where the processor communicates with a receiver in communication with a display controller.

8. The video synchronizer of claim 5 where the computer program code that compensates for the leading or the lagging difference adjusts the long frame count or the short frame count of the cadence pattern when the leading or the lagging difference exceeds a programmable threshold.

9. The video synchronizer of claim 8 where the programmable threshold comprises a display device frame duration.

10. The video synchronizer of claim 5 where the computer program code that compensates for the leading or the lagging difference decreases the long frame count of the cadence pattern when the lagging difference exceeds the programmable threshold.

11. The video synchronizer of claim 10 where the computer program code that compensates for the leading or lagging difference increases the short frame count of the cadence pattern when the leading difference exceeds the programmable threshold.

12. The video synchronizer of claim 11 where the programmable threshold comprises a display device frame duration.

13. The video synchronizer of claim 10 where the programmable threshold comprises a display device frame duration.

14. The video synchronizer of claim 5 where the computer program code that compensates for the leading or lagging difference increases the short frame count of the cadence pattern when the leading difference exceeds the programmable threshold.

15. The video synchronizer of claim 14 where the programmable threshold comprises a display device frame duration.

16. The video synchronizer of claim 1 where the cadence controller is programmed to compensate for the difference by increasing the short frame count of the cadence pattern when the output of the video time calculator leads the master time reference.

17. A video synchronizer comprising:
   a processor that executes instructions stored on a non-transitory computer readable medium comprising:
      computer program code that processes a frequency in which a screen of a display device is refreshed and a vertical sync signal to render a video presentation time;
      computer program code that compares the video presentation time to a stream of timing pulses or a stream of time stamps associated with an audio stream; and
      computer program code that compensates for a difference between the video presentation time and the stream of timing pulses or the stream of time stamps associated with an audio stream by adjusting a long frame count or a short frame count in a cadence pattern based on a leading or a lagging difference between the video presentation time and the stream of timing pulses or the stream of time stamps associated with the audio stream.

18. The video synchronizer of claim 17 where the computer program code that compensates for the difference adjusts the long frame count or the short frame count of the cadence pattern when the leading or the lagging difference exceeds a predetermined threshold.

19. The video synchronizer of claim 17 where the computer program code that compensates for the leading or the lagging difference decreases the long frame count of the cadence pattern when the lagging difference exceeds a programmable threshold.

20. The video synchronizer of claim 19 where the computer program code that compensates for the leading or the lagging difference increases the short frame count of the cadence pattern when the leading difference exceeds the programmable threshold.

21. The video synchronizer of claim 17 where the computer program code that compensates for the leading or the lagging difference increases the short frame count of the cadence pattern when the leading difference exceeds a programmable threshold.

22. A video synchronizer comprising:
   a video time calculator that monitors the frequency of a video display frame rate and a stream of inter-frame markers;
   a comparator that compares an output of the video time calculator to a master time reference associated with an audio stream; and
   cadence means programmed to compensate for a difference between the master time reference and the output of the video time calculator by adjusting a long frame count or a short frame count in a cadence pattern that renders a transmission to a display when the difference exceeds a display device frame duration, where the cadence means is programmed to compensate for the difference by decreasing the long frame count of the cadence pattern when the output of the video time calculator lags the master time reference;

where the cadence pattern comprises the long frame count and the short frame count.

23. A method comprising:
   processing a frequency of a video display frame rate and a vertical sync signal to render a video presentation time;
   comparing the video presentation time to a stream of timing pulses or a stream of time stamps associated with an audio stream; and
   compensating for a difference between the video presentation time and the stream of timing pulses or the stream of time stamps associated with the audio stream by adjusting a long frame count or a short frame count in a cadence pattern based on a leading or a lagging difference between the video presentation time and the stream of timing pulses or the stream of time stamps associated with the audio stream.

24. The method of claim 23 where the step of compensating for the difference comprises:
   increasing the short frame count of the cadence pattern when the video presentation time leads the stream of timing pulses or the stream of time stamps associated with the audio stream; and
   decreasing the long frame count of the cadence pattern when the video presentation time lags the stream of timing pulses or the stream of time stamps associated with the audio stream.

* * * * *